United States Patent
Benkreira et al.

(10) Patent No.: US 12,002,036 B2
(45) Date of Patent: *Jun. 4, 2024

(54) ENHANCING MERCHANT DATABASES USING CROWDSOURCED BROWSER DATA

(71) Applicant: Capital One Services, LLC, McLean, VA (US)

(72) Inventors: Abdelkader M'Hamed Benkreira, Washington, DC (US); Michael Mossoba, Great Falls, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,766

(22) Filed: Jun. 3, 2022

(65) Prior Publication Data
US 2022/0292493 A1  Sep. 15, 2022

Related U.S. Application Data

(63) Continuation of application No. 16/861,761, filed on Apr. 29, 2020, now Pat. No. 11,354,655.

(51) Int. Cl.
*G06Q 20/38* (2012.01)
*G06F 9/445* (2018.01)
(Continued)

(52) U.S. Cl.
CPC ....... *G06Q 20/382* (2013.01); *G06F 9/44526* (2013.01); *G06F 16/955* (2019.01); *G06Q 20/102* (2013.01); *G06Q 20/384* (2020.05)

(58) Field of Classification Search
None
See application file for complete search history.

(56) References Cited

U.S. PATENT DOCUMENTS 6,243,755 B1 * 6/2001 Takagi ............... G06F 11/3438
  711/170
6,856,963 B1 * 2/2005 Hurwitz ............. G06Q 30/0201
  705/7.29

(Continued)

OTHER PUBLICATIONS

P. Balaji, O. Nagaraju and D. Haritha, "CommTrust: Reputation based trust evaluation in E-Commerce applications," 2017 International Conference on Big Data Analytics and Computational Intelligence (ICBDAC), Chirala, Andhra Pradesh, India, 2017, pp. 318-323. (Year: 2017).*

(Continued)

*Primary Examiner* — Mohammad Z Shaikh
(74) *Attorney, Agent, or Firm* — Banner & Witcoff, Ltd.

(57) ABSTRACT

Systems as described herein may enhance merchant databases using crowdsourced browser data. An electronic payment server may receive cache information associated with the first transaction from a browser extension. The electronic payment server may retrieve a transaction record for a second transaction in a transaction database, wherein the first transaction matches with the second transaction. The electronic payment server may update a merchant record in a private merchant database with a friendly merchant name based on the cache information. Upon determining that the merchant record in the private merchant database exceeds a threshold confidence level, the merchant record may be promoted to a trustworthy database, and the friendly merchant name may be presented to a user device.

20 Claims, 4 Drawing Sheets

(51) Int. Cl.
*G06F 16/955* (2019.01)
*G06Q 20/10* (2012.01)

(56) References Cited

U.S. PATENT DOCUMENTS

| | | | | |
|---|---|---|---|---|
| 6,917,922 | B1* | 7/2005 | Bezos | G06Q 10/0875 |
| | | | | 705/26.81 |
| 7,653,577 | B2* | 1/2010 | Warner | G06Q 30/0609 |
| | | | | 705/1.1 |
| 7,818,399 | B1* | 10/2010 | Ross, Jr. | G06Q 30/0274 |
| | | | | 709/215 |
| 7,860,755 | B2 | 12/2010 | Warner | |
| 8,725,597 | B2* | 5/2014 | Mauseth | G06Q 30/0203 |
| | | | | 705/28 |
| 8,818,882 | B2* | 8/2014 | Carlson | G06Q 30/0601 |
| | | | | 705/26.1 |
| 9,031,877 | B1* | 5/2015 | Santhana | G06Q 20/401 |
| | | | | 705/50 |
| 9,299,076 | B2* | 3/2016 | Wiltzius | G06Q 10/107 |
| 10,089,665 | B2* | 10/2018 | Dickinson | G06Q 30/0609 |
| 10,275,613 | B1* | 4/2019 | Olenoski | H04L 63/20 |
| 10,304,121 | B1 | 5/2019 | Ross, Jr. et al. | |
| 10,482,524 | B1 | 11/2019 | Daskalakis | |
| 10,534,851 | B1* | 1/2020 | Chan | G06Q 30/0255 |
| 10,719,834 | B2* | 7/2020 | Faro | G06Q 30/00 |
| 10,733,559 | B2* | 8/2020 | Williams | G06F 16/24578 |
| 10,909,608 | B2* | 2/2021 | Chang | G06Q 30/0204 |
| 11,010,787 | B1* | 5/2021 | Tietzen | G06Q 30/0205 |
| 11,030,535 | B1* | 6/2021 | Arora | G06N 5/04 |
| 11,093,919 | B2* | 8/2021 | Katzin | G06Q 20/027 |
| 11,354,655 | B2* | 6/2022 | Benkreira | G06F 16/955 |
| 11,562,830 | B2* | 1/2023 | Zheng | G06Q 30/018 |
| 2002/0010684 | A1* | 1/2002 | Moskowitz | G06Q 20/40 |
| | | | | 713/176 |
| 2002/0111919 | A1* | 8/2002 | Weller | G06Q 20/12 |
| | | | | 705/67 |
| 2002/0120559 | A1* | 8/2002 | O'Mara | G06Q 40/08 |
| | | | | 705/38 |
| 2004/0044563 | A1* | 3/2004 | Stein | G06Q 30/0203 |
| | | | | 705/7.32 |
| 2006/0009994 | A1* | 1/2006 | Hogg | G06Q 50/01 |
| | | | | 705/319 |
| 2008/0140441 | A1* | 6/2008 | Warner | G06Q 10/00 |
| | | | | 705/26.1 |
| 2008/0270209 | A1* | 10/2008 | Mauseth | G06Q 30/0201 |
| | | | | 705/7.29 |
| 2009/0048884 | A1* | 2/2009 | Olives | G06Q 40/00 |
| | | | | 705/40 |
| 2009/0150262 | A1* | 6/2009 | Mizhen | G06Q 30/0601 |
| | | | | 705/26.1 |
| 2010/0138340 | A1* | 6/2010 | Shirey | G06Q 20/4016 |
| | | | | 705/40 |
| 2011/0145138 | A1* | 6/2011 | Bradley | G06Q 30/06 |
| | | | | 705/39 |
| 2012/0030116 | A1* | 2/2012 | Shirey | G06Q 20/04 |
| | | | | 705/44 |
| 2012/0191568 | A1* | 7/2012 | Gandhi | G06Q 30/0633 |
| | | | | 705/26.8 |
| 2012/0296825 | A1* | 11/2012 | Warner | G06Q 30/0185 |
| | | | | 705/44 |
| 2013/0085804 | A1* | 4/2013 | Leff | G06Q 30/0201 |
| | | | | 705/7.29 |
| 2013/0206093 | A1* | 8/2013 | Visuri | F02M 1/00 |
| | | | | 123/179.3 |
| 2013/0282443 | A1* | 10/2013 | Bal | G06Q 30/0609 |
| | | | | 705/7.36 |
| 2013/0311875 | A1* | 11/2013 | Pappas | G06F 40/143 |
| | | | | 715/234 |
| 2014/0040071 | A1* | 2/2014 | Raman | G06Q 30/0613 |
| | | | | 705/26.41 |
| 2014/0046794 | A1* | 2/2014 | Vallery | G06Q 30/0631 |
| | | | | 705/26.7 |
| 2014/0129311 | A1* | 5/2014 | Patrick | G06Q 50/01 |
| | | | | 705/14.23 |
| 2015/0206093 | A1* | 7/2015 | Trew | G06Q 10/083 |
| | | | | 705/337 |
| 2015/0363840 | A1* | 12/2015 | Gupta | G06Q 30/0282 |
| | | | | 705/347 |
| 2016/0019613 | A1* | 1/2016 | Roof | G06Q 30/0609 |
| | | | | 705/26.35 |
| 2016/0019614 | A1* | 1/2016 | Dziuk | G06Q 30/0613 |
| | | | | 705/38 |
| 2016/0019628 | A1* | 1/2016 | Udumudi | G06Q 30/0633 |
| | | | | 705/26.1 |
| 2016/0125337 | A1* | 5/2016 | Von Walstrom | G06Q 10/06313 |
| | | | | 705/7.23 |
| 2016/0180325 | A1* | 6/2016 | Davis | G06Q 20/40 |
| | | | | 705/44 |
| 2016/0180436 | A1* | 6/2016 | Arana | G06F 21/33 |
| | | | | 705/14.23 |
| 2017/0109831 | A1* | 4/2017 | Arvapally | G06Q 40/12 |
| 2017/0140381 | A1* | 5/2017 | Ducrohet | H04L 63/0853 |
| 2017/0148046 | A1* | 5/2017 | Akbarpour Mashadi | G06Q 30/0629 |
| 2017/0278174 | A1* | 9/2017 | Harrell | G06Q 30/0643 |
| 2018/0232820 | A1* | 8/2018 | Kohli | G06Q 50/12 |
| 2019/0205951 | A1* | 7/2019 | Brock | G06Q 30/0282 |
| 2019/0340606 | A1* | 11/2019 | Olenoski | G06Q 20/3224 |
| 2019/0347649 | A1* | 11/2019 | Thompson | H04L 67/34 |
| 2020/0211020 | A1* | 7/2020 | Allbright | G06N 20/00 |
| 2021/0019813 | A1* | 1/2021 | Ferguson | G06Q 40/12 |
| 2021/0125262 | A1* | 4/2021 | Corrieri | G06Q 30/0601 |
| 2021/0158349 | A1* | 5/2021 | Wardman | G06Q 20/322 |
| 2021/0174355 | A1 | 6/2021 | Gupta et al. | |
| 2021/0209600 | A1* | 7/2021 | Fontana | G06Q 40/02 |
| 2021/0263978 | A1* | 8/2021 | Banipal | G06N 20/00 |

OTHER PUBLICATIONS

W. Ruimei, W. Shengxiong, W. Tianzhen and Z. Xiling, "Customers E-trust for Online Retailers: A Case in China," 2012 Eighth International Conference on Computational Intelligence and Security, Guangzhou, China, 2012, pp. 573-577 (Year: 2012).*

H. Zhang, Y. Wang and X. Zhang, "Transaction Similarity-Based Contextual Trust Evaluation in E-Commerce and E-Service Environments," 2011 IEEE International Conference on Web Services, Washington, DC, USA, 2011, pp. 500-507. (Year: 2011).*

J. Xie, J. Zhong and P. Deng, "A Robust Trust Management Model for E-commerce System," 2014 IEEE 11th International Conference on e-Business Engineering, 2014, pp. 170-176, (Year: 2014).

S. Luo and S. Wan, "Leveraging Product Characteristics for Online Collusive Detection in Big Data Transactions," in IEEE Access, vol. 7, pp. 40154-40164, 2019 (Year: 2019).

2018, Y. Biantoro, Suhardi, Y. Bandung and N.B. Kumiawan, "Trust Measurement Model of Services Computing Systems: A Case Study on E-commerce Systems," 2018 International Conference on Information Technology Systems and Innovation (ICITSI), pp. 353-357.

* cited by examiner

ENHANCING MERCHANT DATABASES USING CROWDSOURCED BROWSER DATA

CROSS-REFERENCE TO RELATED APPLICATIONS

This application is a continuation of and claims priority to co-pending U.S. patent application Ser. No. 16/861,761, filed Apr. 29, 2020, entitled "ENHANCING MERCHANT DATABASES USING CROWDSOURCED BROWSER DATA," which is hereby incorporated by reference in its entirety.

FIELD OF USE

Aspects of the disclosure relate generally to big data and more specifically to the processing and management of transaction data.

BACKGROUND

In an electronic payment processing network, a financial institution may receive limited payment data from payment requesting systems for transactions originated from a variety of merchants. The financial institution may provide a financial statement to a customer including transaction information such as a merchant name, a transaction amount, and a transaction timestamp. However, the names for uncommon merchants may frequently be displayed in abbreviated forms or codes that may not be readily recognized by the customers. Conventional systems may fail to provide friendly names for the merchants, thereby limiting their ability to provide their customers with insights into the transactions and increasing the likelihood of inadvertent fraud filings from the customers.

Aspects described herein may address these and other problems, and generally improve the quality, efficiency, and speed of processing transaction data to offer insights into the details of the transactions and enhancing merchant databases using crowdsourced browser data.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for enhancing merchant databases using crowdsourced browser data. An electronic payment system may determine that a user has submitted a checkout page for a transaction from a browser extension on a first user device. The electronic payment system may receive cache information associated with the transaction. The cache information may include merchant information, a user identifier and a timestamp associated with the transaction, and the electronic payment system may determine a time period associated with the timestamp. A transaction record including a payment account identifier, a transaction time and a merchant identifier may be retrieved from a transaction database, where the payment account identifier matches with the user identifier, and the transaction time falls within the time period. The electronic payment server may update a merchant record in a private merchant database with a friendly merchant name based on the merchant identifier and the merchant information, where the merchant record associates the merchant identifier with the friendly merchant name. Upon determining that the merchant record in the private merchant database exceeds a threshold confidence level, the merchant record may be promoted to a trustworthy database, and the friendly merchant name may be presented to a second user device.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for enhancing merchant databases using crowdsourced browser data. The electronic payment system may cause to install the browser extension to the first user device. The browser extension may determine a website that the user navigates to is associated with a merchant, and store the cache information in a local cache of the first user device. Based on a determination that the user has successfully completed a checkout process, the cache information may be sent to the electronic payment server. Conversely, based on a determination that the user has navigated away from the website without completing the checkout process, the cache information may be deleted from the local cache of the first user device.

The electronic payment server as described herein allows for determining an element in a Document Object Model (DOM) indicating a completion of a checkout process, determining specific terms on a website that indicates a completion of a checkout process, and/or specific terms in a Universal Resource Locator (URL) that indicates a completion of a checkout process.

In many aspects, the electronic payment server may retrieve a plurality of transaction records that occur within the determined time period from the transaction database, determine the transaction record from the plurality of transaction records based on that the payment account identifier in the cache information matches with the user identifier in the transaction record, and based on that a first transaction amount in the cache information matches with a second transaction amount in the transaction record. The electronic payment server may determine a total number of merchant records in the private merchant database that associate the merchant identifier with the friendly merchant name. In response to a determination that the total number exceeds a threshold value, the merchant record may be promoted to the trustworthy database, and the friendly merchant name may be presented to a second user device.

Merchant Database Enhancing Systems

Figure 1:
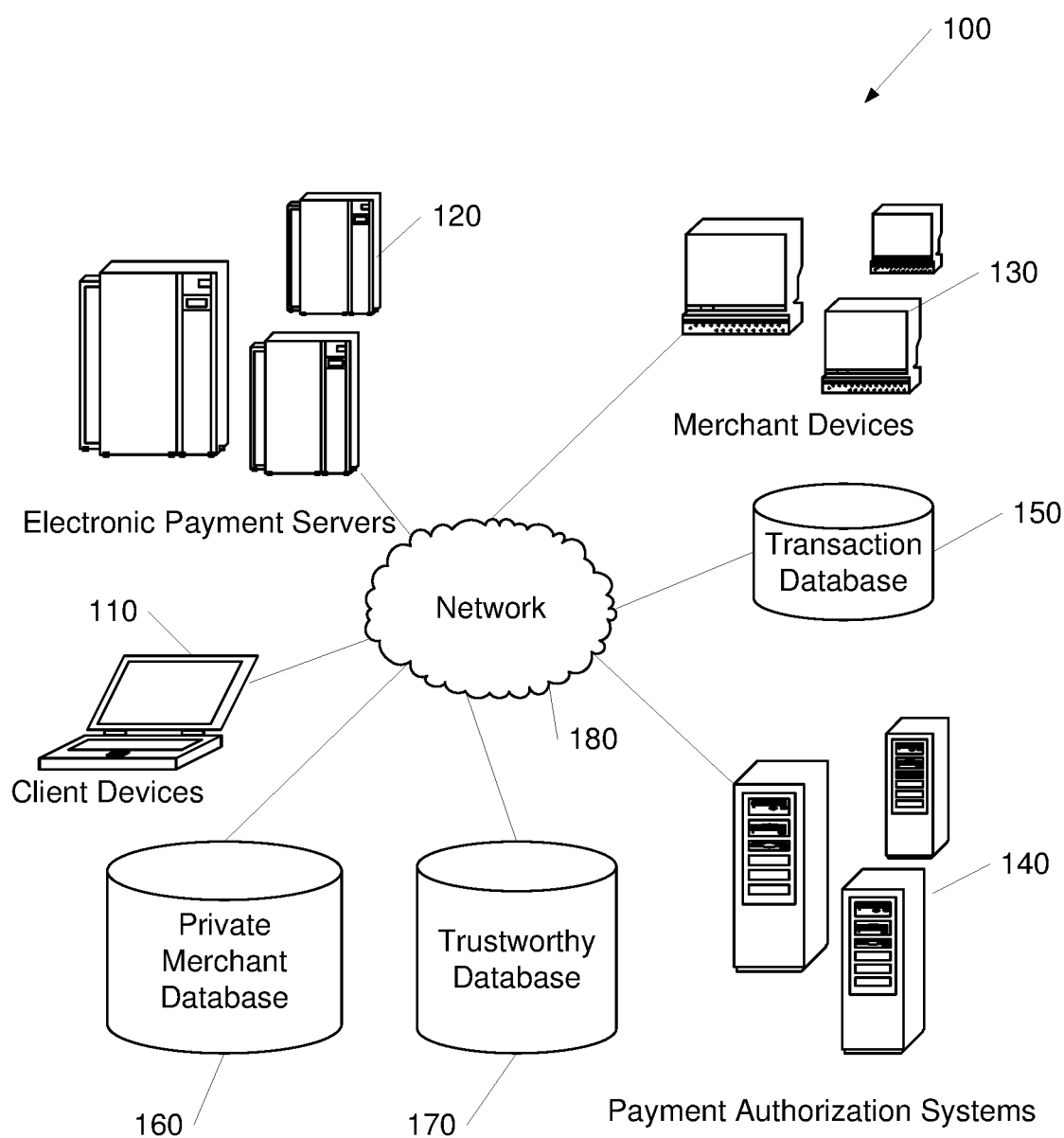
FIG. 1 shows an example of a system for enhancing merchant databases using crowdsourced browser data in which one or more aspects described herein may be implemented.

FIG. 1 shows a merchant database enhancing system 100. The merchant database enhancing system 100 may include at least one client devices 110, at least one electronic payment servers 120, at least one merchant device 130, at least one payment authorization systems 140, at least one transaction database 150, at least one private merchant database 160, and/or at least one trustworthy database 170 in communication via a network 180. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may submit transaction information related to a user such as a user identifier, a transaction amount, merchant information and a transaction timestamp, and/or send a request to obtain a financial statement associated with a previous transaction including merchant information such as a friendly merchant name. Client devices 110 may detect that a browser extension is installed in client devices 110, and determine a user has navigated to a website that may be associated with a merchant. Client devices 110 may store the cache information in a local cache and the cache information may include a user identifier, the merchant information, the transaction amount and the timestamp associated with the transaction. Client devices 110 may determine that the user has successfully completed a checkout process, and send the cache information to electronic payment servers 120. Client devices 110 may determine that the user has navigated away from the website without completing the checkout process, and delete the cache information from the local cache.

In a variety of embodiments, the browser extension installed on client devices 110 may monitor the user behavior, detect that the user has navigated to a website that may be associated with a merchant or determine that the user has completed a checkout process. For example, a DOM may be generated by the web browser on the client device by parsing HTML received from a web server to generate in-memory objects used by a web browser to render a web page on a computing device. The browser extension may search for a heading element in the DOM, which may include an object that may be created in a certain way to indicate an e-commerce site on a platform. The browser extension may search for a specific element in the DOM that the checkout process has completed on the e-commerce site. The browser extension may also search for a specific element in the DOM that may indicate a name of the e-commerce site or the merchant.

The browser extension may search for a specific term on a website that indicates a completion of a checkout process. For example, the browser extension may search for specific term on a HTML page using Natural Language Processing (NLP) and recognize a checkout page on the website, or a page indicating, for example, "your checkout is complete" or "thank you for your purchase."

The browser extension may search for a specific term in a URL that indicates a completion of a checkout process. For example, the browser extension may parse the URL and identify a "/checkout" portion on the URL or other terminologies that indicate that the transaction is complete.

Electronic payment servers 120 may receive requests from client devices 110 to display previous transaction information. Electronic payment servers 120 may receive cache information from client devices 110 after the user completes a checkout process. Electronic payment servers 120 may receive the friendly merchant name contained in the cache information directly from the client devices 110. Electronic payment servers 120 may parse the cache information to obtain the friendly merchant name. For example, electronic payment servers 120 may search for a specific element in the DOM contained in the cache information that may indicate a name of the e-commerce site or the merchant.

Electronic payment servers 120 may search for a specific term related to a merchant website contained in the cache information. For example, electronic payment servers 120 may search for specific term on a HTML page using Natural Language Processing (NLP) and recognize the friendly name of the merchant, for example, "thank you for your purchase at ABC Store." Electronic payment servers 120 may search for a specific term in a URL contained in the cache information. For example, electronic payment servers 120 may parse the URL and identify a portion on the URL that may indicate the friendly merchant name.

After determining that the user has completed a checkout process successfully, electronic payment servers 120 may receive the cache information from client devices 110 that includes the transaction information. Electronic payment servers 120 may determine a time period (e.g. 5 or 10 minutes) before or after the timestamp of the transaction that contained in the cache information.

Merchant devices 130 may send a request for authorization for a transaction to payment authentication systems 140, which may approve or deny the request. After the transaction is authorized, a transaction record may be generated in transaction database 150.

Transaction database 150 may store transaction records related to transactions previously conducted by users in transaction streams from a plurality of merchants. Transaction database 150 may receive a request from electronic payment servers 120 and retrieve the corresponding transaction records in the transaction streams. The transaction records may each contain a payment account identifier, a transaction time and a merchant identifier. The payment account identifier in the transaction record may match with the user identifier in the cache information, and the transaction time in the transaction record may fall within the time period.

In the event that electronic payment servers 120 may identify and retrieve a corresponding transaction record in the transaction database 150, electronic payment servers 120 may create or update a merchant record in private merchant database 160. Private merchant database 160 may be a merchant database that stores merchant records, which may in turn include a user identifier, a merchant identifier, and a friendly merchant name for some records in the merchant database. Private merchant database 160 may be a staging area for trustworthy database 170. For example, after electronic payment servers 120 identify a matching record in transaction database 150 based on the caching information from a user device, electronic payment servers 120 may create or update a record in private merchant database 160 as a "my record" for the particular user that conducts the related transaction. If the merchant record exceeds a threshold confidence level, for example, there are 20 merchant records originated from various users in private merchant database 160 that have the same association between a merchant identifier with the same friendly merchant name, that particular merchant record may be promoted to trustworthy database 170.

Electronic payment servers 120 may receive a request from user devices 110 to display a financial statement of previously conducted transactions that may be associated with the merchant record. If the merchant record in private merchant database 160 does not exceed a threshold confidence level and before the merchant record may be promoted to trustworthy database 170, the friendly merchant name may be displayed to a particular user that has a corresponding "my record" in private merchant database 160. After the merchant records are promoted to trustworthy database 170, the friendly merchant name may be displayed to any user that requests such information. For example, the user may request a financial statement containing a transaction that is associated with the merchant identifier corresponding to the friendly merchant name in trustworthy database 170.

Electronic payment servers 120 may be a system independent from payment authorization systems 140. Electronic payment servers 120 may also be a component residing on payment authorization systems 140.

Client devices 110, electronic payment servers 120 and/or payment authorization systems 140 may be associated with a particular authentication session. Electronic payment servers 120 and payment authorization systems 140 may receive, process, and store a variety of transaction records and crowdsourced browser data, create, update, and promote merchant records in the databases, and/or share merchant data with client devices 110 as described herein. However, it should be noted that any device in merchant database enhancing system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 180 may include a local area network (LAN), a wide area network (WAN), a wireless telecommunications network, and/or any other communication network or combination thereof.

The data transferred to and from various computing devices in merchant database enhancing system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the item level data prediction system 100 in front of one or more computing devices such that any external devices may communicate directly with the specialized hardware.

Computing Devices

Figure 2:
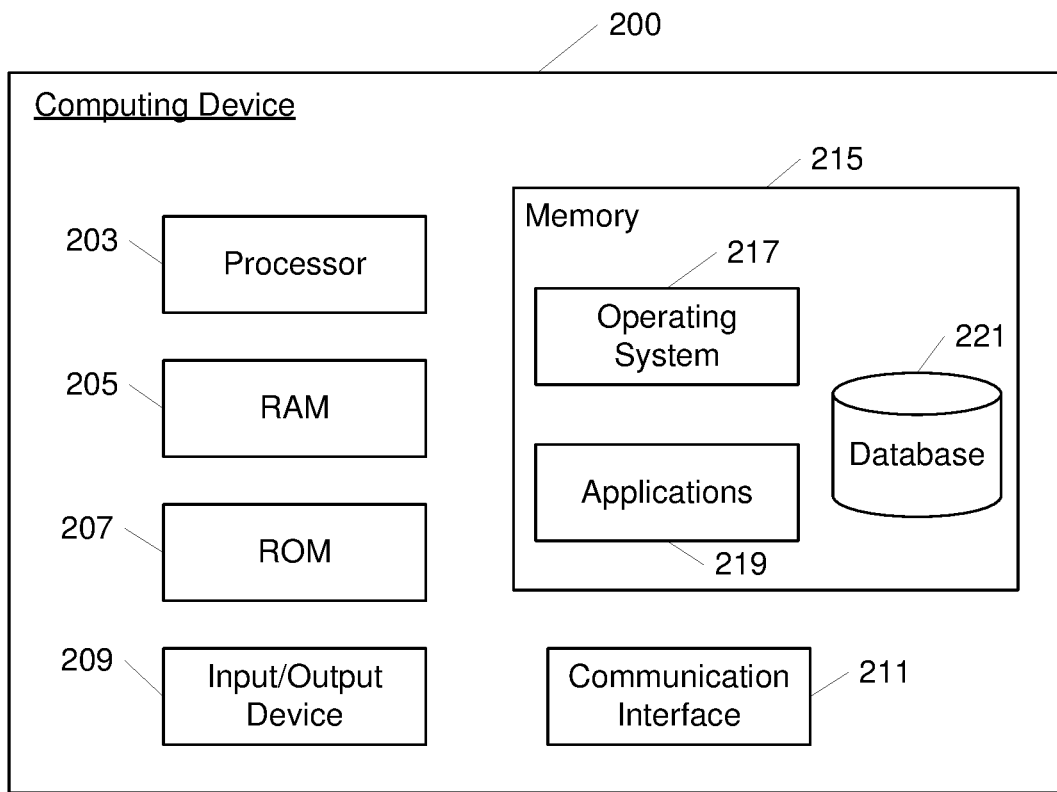
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Enhancing Merchant Databases Using Crowdsourced Browser Data

The electronic payment servers may dynamically generate friendly merchant names based on crowdsourced browser data and provide insights into previously conducted transactions upon user requests. When a financial institution receives the transaction information in a transaction stream, the transaction information may be in the form of a line of data that offers limited information about the transaction, with each piece of information appearing in certain locations within the line of data. For example, the merchant identifier may appear in a specific location and may include 8-10 characters in the abbreviated form. This line of data may be inherited from the format of legacy systems dated back, for example, 30 years ago. Conventional payment processing systems may attempt to look up the merchant identifier from a third party database system to find a meaningful merchant name. This process may be time consuming as the conventional payment processing systems must wait for the third party system to respond. Another limitation of third party database systems is that new merchants, particularly uncommon merchants may not show up in the third party database system for a prolonged period of time. The processes and systems described herein overcome these limitations and improve the ability of the system to generate reports having transaction information including the friendly merchant names.

Figure 3:
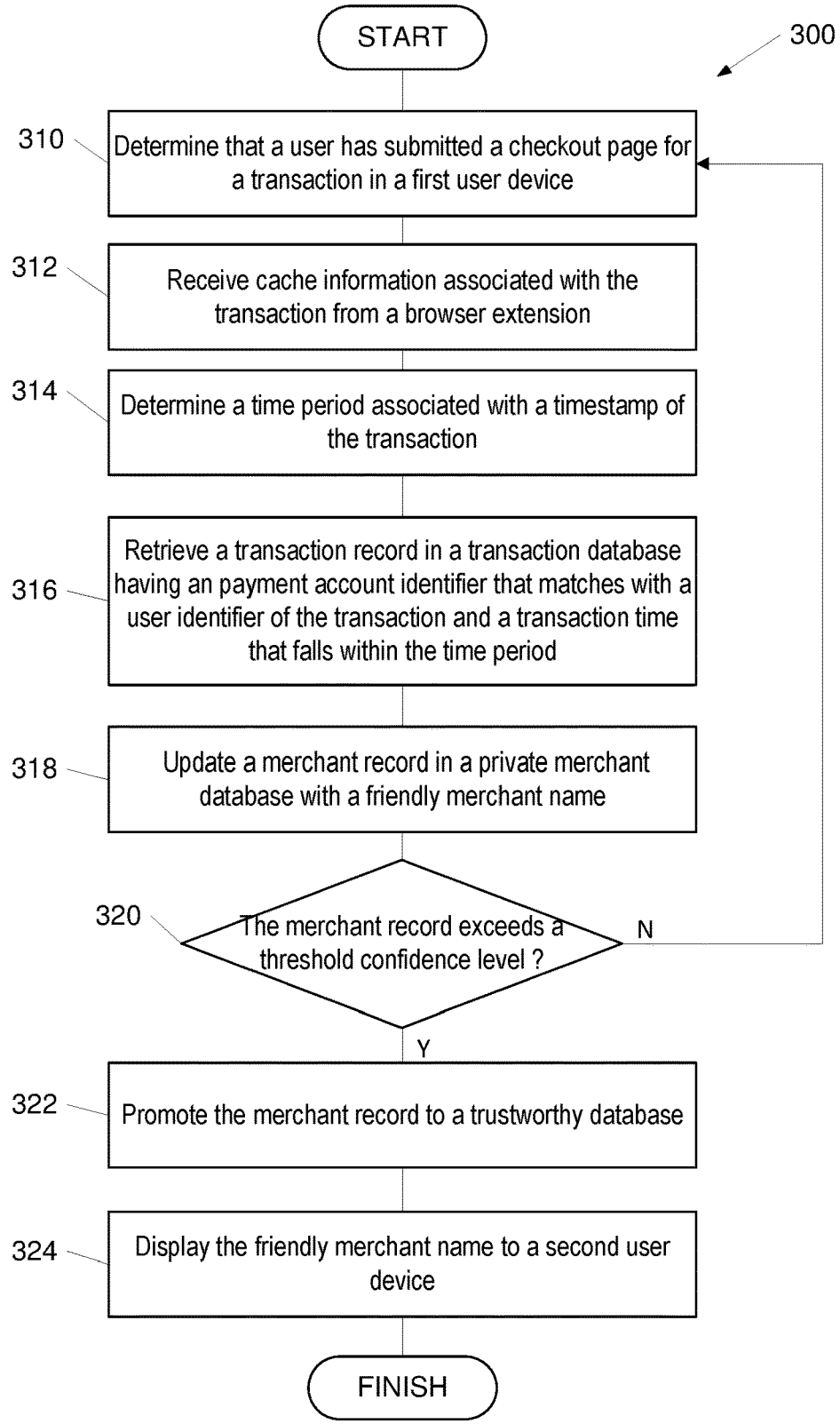
FIG. 3 shows a flow chart of a process for enhancing merchant databases using crowdsourced browser data according to one or more aspects of the disclosure.

FIG. 3 shows a flow chart of a process for enhancing merchant databases using crowdsourced browser data according to one or more aspects of the disclosure. Some or all of the steps of process 300 may be performed using one or more computing devices as described herein.

At step 310, it may be determined that a user has submitted a checkout page for a transaction from a first user device. When a user conducts a transaction, for example, when the user swipes a credit card to make a purchase, the transaction information may be transmitted to a financial institution. The transaction information may include a user identifier, a transaction amount, a transaction timestamp, and a merchant identifier. The transaction information may frequently be transmitted as a line of data with every piece of information located in a specific position. For example, the merchant identifier may be an 8-10 character code not readily recognizable to infer a friendly merchant name. The electronic payment server may process this line of data, and translate the merchant identifier into a readable name for a common merchant. For example, if the user made a purchase at an Apple store, it may be likely that the merchant name may be displayed as a friendly merchant name "Apple" on the user's credit card statement, because that name may be common enough to be readily translated into a user-friendly format. However, the translation process may be time consuming for uncommon merchants, and it may not be feasible to manually set up the mapping between the merchant code and the friendly merchant name for each merchant, particularly for smaller merchants that may only exist for 6 months and never have more than $2000 of sales in revenue.

When a user receives a financial statement such as a credit card statement, a merchant name listed on the statement may be truncated. For example, the merchant name may be displayed as "sq*." Given the merchant name is not displayed as a friendly merchant name, the user may not recognize the merchant is indeed "Square One" department store. As the user may not be able to identify the merchant or remember shopping at a particular merchant on a given day, the user may be likely to create a fraud filing for a valid transaction. The financial institute may spend resources to conduct the fraud proceedings and may suffer financial losses for these incorrect fraud filings. Similarly, a user may conduct transactions via a payment portal or a large e-commerce website that may support numerous small merchants. For example, if the user makes a purchase from a small merchant "Joe's Sports and Game Shop," when the user receives a statement associated with the user's transaction history, the merchant name displayed may not be the friendly name that is readily recognizable for the actual transaction.

In a variety of embodiments, the user may submit a checkout page on a website via a browser on a user device. The browser extension may collect and store the cache information on the user device. After the user has submitted a checkout page for the transaction, the browser extension may send the cache information associated with the transaction to the electronic payment server. An electronic payment server may monitor and detect, via a browser extension installed on the user device, that a user has submitted a checkout page for a transaction. The user device may identify an element in a DOM indicating a completion of a checkout process, such as a heading element in the DOM, which may indicate an e-commerce site such as "Joe's Sports and Game Shop" on a platform. The user device may search for a specific element in the DOM to determine that a checkout process has completed on the e-commerce site "Joe's Sports and Game Shop."

In a variety of embodiments, the user device may search for a specific term on a website that indicates a completion of a checkout process. For example, the user device may search for a specific term on a HTML page such as "Joe's Sports and Game Shop" using NLP (Natural Language Processing). The user device may recognize the terms such as "your checkout is complete" or "thank you for shopping at Joe's Sports and Game Shop," which indicates a checkout page on the website of "Joe's Sports and Game Shop" has been submitted.

In a variety of embodiments, the user device may search for a specific term in a URL that indicates a completion of a checkout process. For example, the user device may parse the URL associated with "Joe's Sports and Game Shop" and identify a "/checkout" portion on the URL or other terminologies that indicate that the transaction has been completed.

At step 312, cache information associated with the transaction may be received from a browser extension. The electronic payment server may receive the cache information from the browser extension installed on the user device. The cache information may include the merchant information, a user identifier, a transaction amount and a timestamp associated with the transaction.

In a variety of embodiments, as a user navigates through different websites on the internet, the browser extension may cache the related information in a local cache. For example, the browser extension may cache the URLs of a website such as "http://www.joessportsgameshop.com/gp/bestsellers/?ref_=nav_cs_bestsellers." The browser extension may parse the URLs or use NLP to identify the name of the merchant "Joe's Sports and Game Shop." The browser extension may send the URLs to the electronic payment server, which may in turn parse the URLs or use NLP to identify the names of the merchants.

The browser extension or the electronic payment server may search for H1 element or an element in the header in the DOM. The corresponding DOM element may indicate that an object may be created a certain way to indicate that an ecommerce site created on the platform. The browser extension or the electronic payment server may search for specific elements indicating the name of the merchant such as "Joe's Sports and Game Shop." The browser extension or the electronic payment server may search for a specific location on a website or a specific tag on the HTML page of the website to identify the merchant name.

In a variety of embodiments, if the user allows the electronic payment server to monitor the usage of the browser via the browser extension, the merchant information may be cached in the local cache of the user device. The cache information may include the merchant name, URLs, social media handles of the merchant, and customer service email or phone number handle of merchant, and/or any information that maybe retrieved from the merchant's website. The electronic payment server may receive the cache information after a determination by the browser extension on the user device that the user has submitted the checkout page for the transaction.

In a variety of embodiments, the electronic payment server may actively detect a transaction from the transaction stream. The electronic payment server may request the browser extension to send the cache information to the electronic payment server proactively. The electronic payment server may request the browser extension to send the cache information periodically, for example, every 30 or 60 minutes. The electronic payment server may request the browser extension to send the cache information after the user submits a checkout page. The electronic payment server may wait for the browser extension to send the cache information after the browser extension detects that the user submits a checkout page.

At step 314, a time period associated with a timestamp of the transaction may be determined. Once the user submits the checkout page, the transaction information including the cache information may be sent to the electronic payment server in real-time. At approximately the same time, the electronic payment server may identify the authentication request originated from the merchant in the transaction stream associated with the same transaction. The user may also have purchased a few items consecutively from different merchants and several transactions may occur quickly with a time period. To take these situations into consideration, the electronic payment server may determine a time period associated with a timestamp of the transaction. For example, the time period may be a few seconds or minutes before or after the timestamp of the transaction that occurred in the browser extension.

At step 316, a transaction record in a transaction database may be retrieved. The transaction record may have a payment account identifier that matches with a user identifier of the transaction and a transaction time that falls within the time period. Based on the cache information received from the browser extension, the electronic payment server may identify a matching record in the transaction stream. For example, when the user swipes a credit card and submits the checkout page for a transaction, the merchant may also send an authorization request to authorize the credit card payment for the transaction to the financial institution. The authorization request may be sent to a payment authorization system of the financial institution. The authorization request also may be sent to the electronic payment server of the financial institution, which may forward the authentication request to the payment authorization system. In the situation that the functionality of the payment authorization system may merge with that of the electronic payment server, the electronic payment server may receive the authentication request and authorize the transaction. Once the transaction is authorized, the payment authorization system or the electronic payment server may create a transaction record in the transaction database. The transaction record may include a payment account identifier, a transaction amount, a transaction time, and a merchant identifier.

The electronic payment server may match the transaction information of a first transaction received in the cache information with the transaction record of a second transaction in the transaction database, based on the criteria that the payment account identifier of the second transaction in the transaction record matches with the user identifier of the first transaction in the cache information, and the transaction time of the second transaction in the transaction record falls within the time period that the first transaction occurs. The electronic payment server may match the first transaction received in the cache information with the second transaction in the transaction database based on that a first transaction amount of the first transaction matches with a second transaction amount of the second transaction. In particular, the comparison of transaction amount can be used to disambiguate transactions occurring within a threshold time period of a transaction timestamp. After the first transaction is matched with the second transaction, the transaction record of the second transaction which has the merchant identifier may be supplemented with the merchant information from the cache information, such as the merchant name, URLs, social media handles of the merchant, and customer service email or phone number handle of merchant, and/or any information retrieved from the merchant's website. The electronic payment server may associate the merchant identifier in the transaction record with a more meaningful friendly merchant name.

In a variety of embodiments, after the user has submitted a checkout page, the electronic payment server may proactively call the transaction database. The electronic payment server may identify, from the transaction database, that the same user may have made a purchase, for example, at Joe's Sports and Game Shop at approximately the same timeframe. The browser extension may send the cache information that has been captured, and the electronic payment server may match up with any transaction that may come cross the transaction stream for that user at Joe's Sports and Game Shop and at the specified timeframe associated with the transaction timestamp captured in the cache information. If the electronic payment server finds a match, a merchant record that associates the merchant identifier with the friendly merchant name "Joe's Sports and Game Shop" may be created.

In the event that the cache information contains merchant name as "Joe's Sports and Game Shop," while the transaction record indicates that the transaction occurred on Amazon at approximately the same time, the electronic payment server may identify that the Amazon transaction may not be a match and proceed to search for other transactions in the transaction database that was conducted during the short time window or the time period. It is may be possible that several transactions may occur consecutively as the user may purchase several items from various merchants quickly within the short time window.

There may be situations that the electronic payment server may not be able to find the matching transaction record in the transaction database. For example, a user may use a browser extension from a first financial institution, and use a credit card from a second financial institution to conduct a transaction. The transaction from the second financial institution may not show up on the transaction stream from the first financial institution. If the electronic payment server identifies no matching transaction in the transaction stream for "Joe's Sports and Game Shop," the electronic payment server may discard the cache information within certain time period, ranging from several seconds to several minutes, depending on how long the matching process may take.

At step 318, a merchant record in a private merchant database may be updated with a friendly merchant name. The merchant record may associate the merchant identifier in the transaction record with the friendly merchant name obtained from the cache information. The electronic payment server may map the transaction that is currently occurring in the browser of the user device with the transaction that is identified in the transaction stream. The electronic payment server may search for the merchant identifier in the transaction record and map it to the merchant information captured in the cache information of the browser. For example, in the transaction database, electronic payment server may identify a transaction record that has a merchant identifier in the format of an 8 character code "JSGSTC01" which may not be readily recognizable by the user. After this transaction record is matched up with the cache information captured in the browser, the electronic payment server may infer that the same merchant corresponds to the URL http://www.joessportsgameshop, and the friendly merchant name "Joe's Sports and Game Shop." From the merchant's social profile that captured in the browser cache information, the electronic payment server may identify that the merchant has a physical location in Tysons Corner, Virginia, and obtain the phone number and email address for customer service. If there is no record in the private merchant database that makes an association between the merchant identifier and the friendly merchant name, the electronic payment server may create a merchant record that associates the merchant identifier "JSGSTC01" with the friendly merchant name "Joe's Sports and Game Shop." In a variety of embodiments, if the private merchant database already has a merchant record that captures the relationship between the merchant identifier "JSGSTC01" and the friendly merchant name "Joe's Sports and Game Shop," such merchant record may be updated with a field that includes a transaction identifier or additional merchant information such as the social profile of the merchant, merchant website, the email address and phone number.

The private merchant database may serve as a staging area before the merchant records may be confirmed as trustworthy and before it may be promoted to a trustworthy database. In a variety of embodiments, the merchant records and the associated friendly merchant names in the private merchant database maybe presented to a limited subset of users, particularly users who have conducted a related transaction in the browser extension that has a match with a transaction in the transaction stream. The merchant information including the friendly merchant name in the private merchant database may be presented to the user associated with the transaction that has the corresponding "my record."

In a variety of embodiments, the merchant records in the private merchant database may not be visible to the users that have not conducted the related transactions. For example, a first user may make a purchase at "Joe's Sports and Game Shop" and a browser extension at the first user device may capture the cache information. The electronic payment server may identify a matching transaction in the transaction stream and create an associated between the identifier "JSGSTC01" with the friendly merchant name "Joe's Sports and Game Shop." A second user may make a purchase at "Joe's Sports and Game Shop," but may not have the browser extension installed on the second user device. A third user may make a purchase at "Joe's Sports and Game Shop," but may identify no matching transaction in the transaction stream. When the first user, the second user and the third user each requests a financial statement related to their transactions, the friendly name "Joe's Sports and Game Shop" may be presented to the first user, but not to the second user and the third user.

At step 320, a determination may be made whether the merchant record in the private merchant database exceeds a threshold confidence level. The confidence level may be determined by a total number of merchant records in the private merchant database that may share the same association between a merchant identifier and a friendly merchant name. The confidence level may be determined by a multifactor scoring metric to consider factors including the total number of the relevant merchant records in the private merchant database. For example, for the merchant records in the private merchant database that associate a merchant identifier with a particular friendly merchant name, the electronic payment server may consider whether the transactions related to the merchant records are conducted by the same user at various times or by different users. For the subset of merchant records that are originated from transactions conducted by different users, the electronic payment server may assign a relatively higher weight in the scoring metric than for the subset of merchant records that are originated from transactions conduct by the same user. The scoring metric may also consider other factors such as the transaction amount, the user ratings of the merchant in the social profile, user feedback/verification of the friendly merchant name. For example, if the merchant records are related to transactions with trivial transaction amounts, the electronic payment server may assign a relatively lower weight in the scoring metric for these merchant records. If a merchant has been rated highly in the social profile of the merchant, the electronic payment server may assign a relatively higher weight in the scoring metric for these merchant records. If the user has an option to provide feedback to verify that the friendly merchant name is indeed the merchant they have purchased from, the electronic payment server may assign a relatively higher weight in the scoring metric for the merchant records that contain this friendly merchant name.

The electronic payment server may determine a total number of merchant records in the private merchant database that associate the merchant identifier "JSGSTC01" with the friendly merchant name "Joe's Sports and Game Shop." As these merchant records may be related to transactions originated from various users that have made purchases at Joe's Sports and Game Shop, the association may have been verified by these transactions originated from different users. Each of these transactions may generate a corresponding merchant record in the private merchant database, and each merchant record may share the same association between the merchant identifier "JSGSTC01" with the friendly merchant name "Joe's Sports and Game Shop." For example, a first merchant record may include the data fields: transaction ID1, user identifier 1, merchant identifier "JSGSTC01," friendly merchant name "Joe's Sports and Game Shop." A second merchant record may contain the data fields: transaction ID2, user identifier 2, merchant identifier "JSGSTC01," friendly merchant name "Joe's Sports and Game Shop." As such, the confidence level may be reflected on the total number of merchant records that share the same association in the private merchant database and the electronic payment server may determine whether the total number exceeds a threshold value.

In a variety of embodiments, the threshold value may be set relatively low, such as 5, if the financial institution prefers to present the friendly merchant name to the users more readily to deter inadvertent fraud filings. The threshold value may be set relatively high, such as 50, if the financial institution prefers to maintain a high confidence level on the friendly merchant name to be presented to the users.

If the electronic payment server determines that the total number has not exceeded the threshold value, the process may proceed to step 310, where the electronic payment server may continue to monitor the browser extension and determine that user has submitted a checkout page for a new transaction.

If the electronic payment server determines that the total number has exceeded a threshold value, the process may proceed to step 322, where the merchant record maybe promoted to a trustworthy database. Once the merchant record is promoted to the trustworthy database, the electronic payment server may present the merchant record in the trustworthy database to any user devices upon request. For example, a first user may make a purchase at "Joe's Sports and Game Shop" and have a browser extension installed at the first user device. A second user may make a purchase at "Joe's Sports and Game Shop," but may not have the browser extension installed on the second user device. When the first user and the second user each requests a financial statement related to their transactions, the friendly name "Joe's Sports and Game Shop" may be presented to both the first user and the second user regardless whether a browser extension may be installed on the client device or whether a matching transaction may be identified in the transaction stream. Indeed, the electronic payment server may not need to find the matching transaction in the transaction database. When the user submits a request for a financial statement, the electronic payment server may look up the merchant record in the trustworthy database, and identify the friendly merchant name based on the merchant identifier in the request. The electronic payment server may present the friendly merchant name to any user that may request the relevant merchant information.

In a variety of embodiments, the private merchant database and the trustworthy database may be located separately from each other. The private merchant database and the trustworthy database may be located in different tables of the same database. The private merchant database and the trustworthy database may also be different records in a merged database. For example, each merchant record in the merged database may contain a field "confidence level," which correspond to a counter on how many times an association between a merchant identifier and a friendly merchant name has been verified by distinct transactions or users. The electronic payment server may determine whether to present the friendly name to a subset of users (who have "my record") or all the users who may request such records based on the confidence level.

In a variety of embodiments, when the electronic payment server maps the cache information from the browser extension to a transaction, there may be tens of thousands of records needed to be processed, and the electronic payment server may have a mechanism to handle the potential errors. There may be chances that a merchant record may be created by mistake in the private merchant database. To accommodate the chances for errors, a two-level confidence threshold may be applied. For example, if the confidence level is below 5, the electronic payment server may not display the friendly name to any user. If the confidence level is between 5 and 10, the electronic payment server may display the friendly name to the specific users who have conducted the relevant transactions. If the confidence level is above 10, the electronic payment server may display the friendly name to any users upon request.

At step 324, the friendly merchant name may be promoted to a second user device. Once the merchant record containing the friendly merchant name has been promoted to the trustworthy database, the electronic payment server may display the friendly name to any users when they request the financial statement, including a new user that has no browser extension installed on the user device, or has no matching transaction in the transaction stream.

In a variety of embodiments, the electronic payment server may supply the user with a friendly merchant name and other information about the merchant. When the user examines the transaction history on the financial statement, if the user readily recognizes the merchant from which the user has made a purchase, the user may be unlikely to create an inadvertent fraud filing. Otherwise, if the merchant name is displayed as a code or in a truncated form that is not meaningful to the user, there may be a much higher chance that the user may consider it as fraud and go through fraud proceedings for the related transaction.

Crowdsourcing User Data

Figure 4:
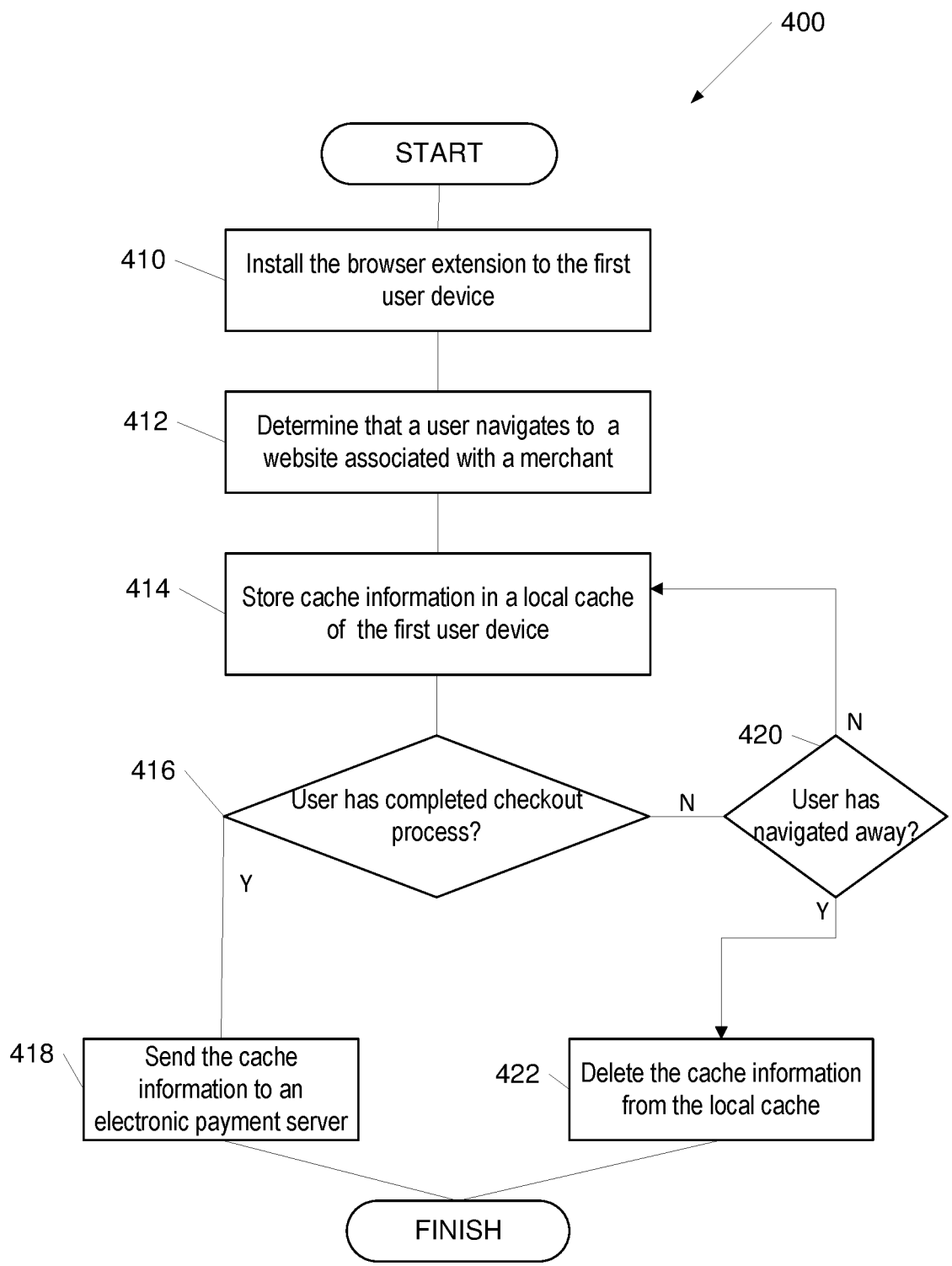
FIG. 4 shows a flow chart of a process for capturing crowdsourced browser data according to one or more aspects of the disclosure.

FIG. 4 shows a flow chart of a process of capturing crowdsourced browser data according to one or more aspects of the disclosure. Some or all of the steps of process 400 may be performed using one or more computing devices as described herein.

At step 410, a browser extension may be installed to a first user device. The electronic payment server may provide an option for a user to download and install the browser extension to the first user device. Once the browser extension from a financial institution is installed on the client device, the browser extension may monitor user actions in a web browser executing on the first user device, read data on the website that the user visits, store the captured information in the local cache of the user device and send the captured information to the electronic payment server associated with the financial institution.

At step 412, it may be determined that a user has navigated to a website that is associated with a merchant. In a variety of embodiments, as a user navigates through different websites on the internet, the browser extension may extract the URLs of a website such as http://www.joessportsgameshop.com. The browser extension may parse the URLs or use NLP to identify the names of the merchant "Joe's Sports and Game Shop." The browser extension may send the URLs or other website data to the electronic payment server, which may in turn parse the URLs or use NLP to identify the names of the merchants.

In a variety of embodiments, the merchant may use a reseller or a merchant platform that actually conducts the transactions, which may impact the merchant URLs and the browser extension or the electronic payment server may not readily identify the name of the merchant from the URLs. The browser extension or the electronic payment server may search for specific elements in the DOM to identify the name of the merchant such as "Joe's Sports and Game Shop." The browser extension or the electronic payment server may search for a specific location on a website or a specific tag on the HTML page of the website to identify the merchant name.

At step 414, cache information may be stored in a local cache of the first user device. If the user allows the electronic payment server to monitor the usage of the browser via the browser extension, the merchant information may be cached in the local cache of the user device. The cache information may be structural data captured at the browser extension that indicates who the merchant is and what the user has purchased. The cache information may include the transaction information and merchant information. The merchant information may include the merchant name, merchant URLs, social media handles of the merchant, and customer service email or phone number handle of merchant, and/or any information may be retrieved from the merchant's website.

At step 416, a determination may be made on whether the user has completed a checkout process. If a browser extension from financial institute A has been installed on the user device, the browser extension may auto-fill payment information on the checkout page to encourage the user to use a credit card from financial institute A to complete transaction. If the user uses a credit card issued by financial institute B, the electronic payment server at financial institute A may not receive the transaction information and may not use the cache information captured by the browser extension to enhance merchant databases. The browser extension or the electronic payment server may identify an element in a DOM indicating a completion of a checkout process. For example, the electronic payment server may examine a heading element in the DOM, which may indicate an e-commerce site such as "Joe's Sports and Game Shop" on a platform. The browser extension or the electronic payment server may search for a specific element in the DOM that a checkout process has completed on the e-commerce site such as "Joe's Sports and Game Shop."

In a variety of embodiments, the browser extension or the electronic payment server may search for a specific term on a website that indicates a completion of a checkout process. For example, the electronic payment server may search for specific term on a HTML page using NLP. The electronic payment server may recognize the terms such as "your checkout is complete" or "thank you for shopping at Joe's Sports and Game Shop."

In a variety of embodiments, the browser extension or the electronic payment server may search for a specific term in a URL that indicates a completion of a checkout process. For example, the browser extension or the electronic payment server may parse the URL associated with the merchant website and identify a "/checkout" portion on the URL or other terminologies that indicate that the transaction is completed.

If the user has completed the checkout process, the process may proceed to step 418, where cache information may be sent to an electronic payment server. The cache information may include the merchant information, such as the merchant name, URLs, social media handles of the merchant, and customer service email or phone number handle of merchant, and/or any information may be retrieved from the merchant's website. The cache information may include transaction information such as a user identifier, a transaction amount, and a transaction timestamp. If the user has not completed the checkout process, the process may proceed to step 420, where a determination may be made whether the user has navigated away from the merchant website. If the user has not navigated away, the process may proceed to step 414 to continue to store the cache information in the local cache. If the user has navigated away without making a purchase, the process may proceed to step 422, where the cache information may be deleted from the local cache of first user device. As such, the electronic payment server may use crowdsourced data from the browser extension to enhance merchant databases such as the private merchant database and eventually the trustworthy database.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   installing a browser extension to a first user device;
   receiving, from the browser extension and by an electronic payment server, information associated with a transaction conducted by a user via the browser extension, wherein the information comprises a trustworthy merchant name, and a user identifier associated with the transaction;
   updating, by the electronic payment server, a merchant record in a private merchant database with the trustworthy merchant name based on a translation from a merchant identifier in a transaction record to the trustworthy merchant name in the information;
   determining, by the electronic payment server, a confidence level of the merchant record based on a number of merchant records in the private merchant database sharing an association between the merchant identifier and the trustworthy merchant name;
   based on a determination that the confidence level exceeds a threshold level, promoting by the electronic payment server, the merchant record to a trustworthy database;
   causing display of the trustworthy merchant name on a second user device;
   determining, via a browser installed with the browser extension, that the user navigates to a website that is associated with a merchant;
   storing information associated with a second transaction in a local cache of the first user device; and
   based on a determination that the user has navigated away from the website without completing a checkout process, deleting the information associated with the second transaction from the local cache.

2. The computer-implemented method of claim 1, wherein determining the confidence level comprises:
   determining the confidence level based on a number of merchant records in the private merchant database sharing an association between the merchant identifier and the trustworthy merchant name.

3. The computer-implemented method of claim 1, wherein the browser extension performs operations comprising:
   based on a determination that the user has successfully completed the checkout process associated with the transaction, sending the information associated with the transaction to the electronic payment server.

4. The computer-implemented method of claim 1, wherein the browser extension performs operations comprising:
   determining, based on the information associated with the transaction, an element in a Document Object Model indicating a completion of the checkout process.

5. The computer-implemented method of claim 1, wherein the browser extension performs operations comprising:
   determining, based on the information associated with the transaction, a specific term on the website that indicates a completion of the checkout process.

6. The computer-implemented method of claim 1, wherein the browser extension performs operations comprising:
   determining, based on the information associated with the transaction, a specific term in a Universal Resource Locator that indicates a completion of the checkout process.

7. The computer-implemented method of claim 1, wherein the information associated with the transaction comprises a first transaction amount and the transaction record comprises a second transaction amount.

8. The computer-implemented method of claim 7, further comprising:
   retrieving, by the electronic payment server, the transaction record from a transaction database based on:
      a payment account identifier in the transaction record matching the user identifier; and
      the first transaction amount matching the second transaction amount.

9. The computer-implemented method of claim 1, further comprising:
   prior to promoting the merchant record to the trustworthy database, causing display, by the electronic payment server, of the trustworthy merchant name to the first user device; and
   receiving, from the first user device, a confirmation on the trustworthy merchant name.

10. The computer-implemented method of claim 1, wherein the information comprises the trustworthy merchant name, a merchant Universal Resource Locator, a merchant social media profile, and merchant contact information.

11. An electronic payment system comprising:
    one or more processors; and
    memory storing instructions that, when executed by the one or more processors, cause the electronic payment system to:
       install a browser extension to a first user device;
       receive, from the browser extension, information associated with a transaction conducted by a user via the browser extension, wherein the information comprises a trustworthy merchant name, and a user identifier associated with the transaction;
       update a merchant record in a private merchant database with the trustworthy merchant name based on a translation from a merchant identifier in a transaction record to the trustworthy merchant name in the information;

determine a confidence level of the merchant record based on a number of merchant records in the private merchant database sharing an association between the merchant identifier and the trustworthy merchant name;

based on a determination that the confidence level exceeds a threshold level, promote the merchant record to a trustworthy database;

cause display of the trustworthy merchant name on a second user device;

determine, via a browser installed with the browser extension, that the user navigates to a website that is associated with a merchant;

store information associated with a second transaction in a local cache of the first user device; and based on a determination that the user has navigated away from the website without completing a checkout process, cause to delete the information associated with the second transaction from the local cache.

12. The electronic payment system of claim 11, wherein the instructions when executed by the one or more processors, cause the electronic payment system to:
determine the confidence level based on a number of merchant records in the private merchant database sharing an association between the merchant identifier and the trustworthy merchant name.

13. The electronic payment system of claim 11, wherein the instructions when executed by the one or more processors, cause the browser extension to:
based on a determination that the user has successfully completed the checkout process associated with the transaction, send the information associated with the transaction to the electronic payment system.

14. The electronic payment system of claim 11, wherein the information associated with the transaction comprises a first transaction amount and the transaction record comprises a second transaction amount.

15. The electronic payment system of claim 14, wherein the instructions when executed by the one or more processors, cause the electronic payment system to:
retrieve the transaction record from a transaction database based on:
a payment account identifier in the transaction record matching the user identifier; and
the first transaction amount matching the second transaction amount.

16. The electronic payment system of claim 11, wherein the instructions when executed by the one or more processors, cause the electronic payment system to:
prior to promoting the merchant record to the trustworthy database, causing display of the trustworthy merchant name to the first user device; and receive, from the first user device, a confirmation on the trustworthy merchant name.

17. The electronic payment system of claim 11, wherein the information comprises the trustworthy merchant name, a merchant Universal Resource Locator, a merchant social media profile, and merchant contact information.

18. One or more non-transitory media storing instructions that, when executed by one or more processors, cause the one or more processors to perform steps comprising:
installing a browser extension to a first user device;
receiving, from the browser extension, information associated with a transaction conducted by a user via the browser extension, wherein the information comprises a trustworthy merchant name, and a user identifier associated with the transaction;
updating a merchant record in a private merchant database with the trustworthy merchant name based on a translation from a merchant identifier in a transaction record to the trustworthy merchant name in the information;
determining a confidence level of the merchant record based on a number of merchant records in the private merchant database sharing an association between the merchant identifier and the trustworthy merchant name;
based on a determination that the confidence level exceeds a threshold level, promoting the merchant record to a trustworthy database; and
causing display of the trustworthy merchant name on a second user device;
determining, via a browser installed with the browser extension, that the user navigates to a website that is associated with a merchant;
storing information associated with a second transaction in a local cache of the first user device; and
based on a determination that the user has navigated away from the website without completing a checkout process, deleting the information associated with the second transaction from the local cache.

19. The non-transitory media of claim 18, wherein the instructions when executed by the one or more processors, cause the one or more processors to further perform steps comprising:
determining the confidence level based on a number of merchant records in the private merchant database sharing an association between the merchant identifier and the trustworthy merchant name.

20. The non-transitory media of claim 18, wherein the information comprises the trustworthy merchant name, a merchant Universal Resource Locator, a merchant social media profile, and merchant contact information.

* * * * *